(12) United States Patent
Lin et al.

(10) Patent No.: US 7,712,122 B2
(45) Date of Patent: May 4, 2010

(54) UNCOMPRESSED IP MULTIMEDIA DATA TRANSMISSION AND SWITCHING

(75) Inventors: Freddie Lin, Redondo Beach, CA (US); Ling Sha, Los Angeles, CA (US); Frank Tian, Temple City, CA (US); Duke Tran, Norwalk, CA (US)

(73) Assignee: Physical Optics Corporation, Torrance, CA (US)

( * ) Notice: Subject to any disclaimer, the term of this patent is extended or adjusted under 35 U.S.C. 154(b) by 1875 days.

(21) Appl. No.: 09/761,114

(22) Filed: Jan. 16, 2001

(65) Prior Publication Data

US 2002/0095681 A1    Jul. 18, 2002

(51) Int. Cl.
*H04N 7/173* (2006.01)
*H04N 7/10* (2006.01)

(52) U.S. Cl. .................................. 725/105; 725/36

(58) Field of Classification Search ................ 348/700, 348/701, 705, 706, 388, 387, 385, 397, 398, 348/409, 416, 420, 421, 390, 384, 406, 9, 348/6, 7, 8; 375/240.03, 240.01, 240.02, 375/240.24, 240, 240.04, 240.05, 240.25, 375/240.26, 240.28; 382/232, 236, 251, 382/239, 248; 725/87, 91, 32; 386/94, 95, 386/46

See application file for complete search history.

(56) References Cited

U.S. PATENT DOCUMENTS

| | | | |
|---|---|---|---|
| 4,071,842 A * | 1/1978 | Tewksbury | .................. 341/143 |
| 4,107,669 A * | 8/1978 | Tewksbury | .................. 341/143 |
| 5,241,383 A | 8/1993 | Chen et al. | |
| 5,521,641 A * | 5/1996 | Kinouchi et al. | ......... 348/401.1 |
| 5,771,081 A | 6/1998 | Lee | |
| 5,795,228 A * | 8/1998 | Trumbull et al. | .............. 463/42 |
| 5,892,535 A * | 4/1999 | Allen et al. | ................... 725/36 |
| 5,911,008 A | 6/1999 | Niikura et al. | |
| 6,088,732 A * | 7/2000 | Smith et al. | ................. 709/229 |
| 6,104,434 A | 8/2000 | Nakagawa et al. | |
| 6,181,711 B1 * | 1/2001 | Zhang et al. | ................ 370/468 |
| 6,546,051 B2 * | 4/2003 | Ramaswamy | .......... 375/240.03 |
| 6,804,454 B2 * | 10/2004 | Ogino et al. | .................. 386/94 |
| 2002/0018477 A1 * | 2/2002 | Katz | .......................... 370/401 |

OTHER PUBLICATIONS

Applications, Oct. 10, 2000, VBrick Systems, Inc., www.vbrick.com.
White Paper, VBrick Systems, Inc.

* cited by examiner

*Primary Examiner*—Behrooz Senfi
(74) *Attorney, Agent, or Firm*—Sheppard Mullin Richter & Hampton LLP (57) ABSTRACT

The present invention provides an apparatus and method of transmitting and switching multimedia data over an Ethernet network. The method includes allocating a portion of an Ethernet bandwidth for channel allocation, receiving a multimedia signal, assigning a channel allocation priority to the multimedia signal, transmitting data including the channel allocation priority in the allocated portion of the Ethernet bandwidth, performing video predictive coding on the multimedia signal to create a video predictive coded multimedia signal, and transmitting the video predictive coded multimedia signal over the network in real time. The multimedia signal comprises a composite video signal.

31 Claims, 12 Drawing Sheets

Coding

Fig. 10a

Decoding

UNCOMPRESSED IP MULTIMEDIA DATA TRANSMISSION AND SWITCHING

BACKGROUND OF THE INVENTION

1. Field of Invention

The present invention is directed to an apparatus and method for transmitting, receiving, and switching multimedia across an Ethernet network.

2. Description of Related Art

Presently, audio and video are transmitted over various mediums for various purposes. These purposes include security transmissions, class lecture transmissions (distance learning), business seminar transmissions, surgical procedure transmissions, video conferencing transmissions, and the like. For example, security cameras are stationed at various remote locations in a building. The security video from the cameras is transmitted over dedicated lines and switches to a security station to monitor activity at the remote locations. Quite often the buildings having such security systems also have local area data networks such as Ethernet networks for transmitting data. Unfortunately, two separate systems must be used for the security and data network systems because of problems encountered in combining the systems.

In particular, security video is time sensitive and encounters unacceptable delays when transmitted on a data network. Additionally, data networks do not provide adequate bandwidth for transmitting uncompressed real time continuous video. Thus, the transmission of video across a data network requires extensive compression. Unfortunately, such compression is slow, complex, and/or prohibitively expensive for security systems, or the like. Furthermore, data networks do not prioritize video data. Therefore, the video data is often broken up and suffers considerable delays. Similar problems are encountered in the transmission of lectures, seminars, video conferencing, and other like real time video transmissions. Thus, independent networks must be maintained for uncompressed real time continuous video transmission and for data transmission because combining the transmissions is ineffective and/or cost prohibitive.

SUMMARY OF THE INVENTION

The present invention provides a method and apparatus for transmitting continuous video across an Ethernet network. The Ethernet network in this patent includes Fast Ethernet, (100 Mb/s) or higher, such as Gigabit Ethernet (Gb/s), 10 Gigabit Ethernet (10 Gb/s), and the like. The method includes allocating a portion of an Ethernet bandwidth for channel allocation, receiving a multimedia signal, assigning a channel allocation priority to the multimedia signal, transmitting data including the channel allocation priority in the allocated portion of the Ethernet bandwidth, performing video predictive coding on the multimedia signal to create a video predictive coded multimedia signal, and transmitting the video predictive coded multimedia signal over the network in real time. The multimedia signal comprises a composite video signal.

The transmitting step further includes transmitting a data packet including a header and a payload, wherein the header includes the address of a master switch and the payload includes the channel allocation priority. Additionally, the performing step further includes delaying a first line of the multimedia signal, and subtracting a second line of the multimedia signal from the delayed first line to create the video predictive coded multimedia signal. The method also includes receiving a video predictive coded multimedia signal from the network, performing video predictive decoding on the video predictive coded multimedia signal to create a multimedia signal, and outputting the multimedia signal concurrently with the performing step.

According to another embodiment, the apparatus includes a video input that receives a video signal, a video predictive coding module coupled to the video input, and a network interface coupled to the video predictive coding module and coupled to the network. The video predictive coding module performs video predictive coding on the video signal in real time to create a video predictive coded signal, and the network interface transmits the video predictive coded signal across a network in real time.

The network includes an Ethernet network, such as a Fast Ethernet network or higher, and the video signal comprises a composite video signal. The video predictive coding module includes a delay module coupled to the video input, and a subtraction module coupled to the delay module. The subtraction module subtracts a subsequent line of the video signal from a delayed line of the video signal.

The delay module includes a line buffer that delays a line of the video signal to create the delayed line of the video signal and a timing control module coupled to the video input and coupled to the video predictive coding module. This timing control module controls the timing of the video predictive coding module.

In addition, the apparatus includes a channel allocation module which reserves a channel of the Ethernet network for transmitting the video predictive coded signal according to the priority of the video predictive coded signal. The apparatus also includes an analog to digital converter that converts an input video signal into a digitized video signal. The video predictive coded signal includes at least one line comprising a plurality of pixels.

According to another embodiment, the invention provides an apparatus for receiving video including a network interface that receives a video predictive coded signal from a network, a video predictive decoding module coupled to the network interface, which performs video predictive decoding on the video predictive coded signal in real time to create a video predictive decoded signal, and a video output coupled to the video predictive decoding module. The video output outputs the video predictive decoded signal in real time. The network comprises an Ethernet network and the video signal comprises a composite video signal.

In addition, the video predictive decoding module comprises a subtraction module coupled to the network interface, and a delay module coupled to the subtraction module. This subtraction module subtracts a subsequent line of the video predictive coded signal from a line of the video predictive decoded signal delayed by the delay module. The delay module includes a line buffer which delays a line of the video predictive decoded signal to create a delayed line of the video predictive decoded signal.

The apparatus includes a timing control module coupled to the video output and coupled to the video predictive decoding module, wherein the timing control module controls the timing of the video output. The timing control module includes a clock generation module coupled to the video predictive decoding module, and a memory control module coupled to the video predictive decoding module.

The apparatus further includes a channel allocation module that reserves a channel of the Ethernet network for transmitting the video predictive coded signal according to a priority of the video predictive coded signal. The apparatus additionally includes a digital to analog converter that converts the video predictive decoded signal into an output video signal.

The video predictive coded signal comprises at least one line including a plurality of pixels.

According to another embodiment, the present invention provides a method of transmitting multimedia data over a network including receiving a multimedia signal, performing video predictive coding on the multimedia signal to create a video predictive coded multimedia signal, and transmitting the video predictive coded multimedia signal over the network substantially concurrently with the performing step. The network is an Ethernet network and the multimedia signal is a composite video signal.

The method also includes reserving a portion of an Ethernet bandwidth for channel allocation, assigning a channel allocation priority to the multimedia signal, and reserving a channel path for the multimedia signal. In addition, the performing step includes delaying a first line of the multimedia signal, and subtracting a second line of the multimedia signal from the first line of the multimedia signal to create the video predictive coded multimedia signal.

The method further involves extracting a synchronization signal from the multimedia signal. The performing step performs video predictive coding in synchronization with the synchronization signal. Additionally, the method includes extracting a synchronization signal from the multimedia signal, converting the multimedia signal from analog to digital in synchronization with the synchronization signal to create a digital multimedia signal and buffering the digital multimedia signal in synchronization with the synchronization signal.

The method of receiving multimedia data from a network includes receiving a video predictive coded multimedia signal from the network, performing video predictive decoding on the video predictive coded multimedia signal to create a multimedia signal, and outputting the multimedia signal substantially concurrently with the performing step. The network is an Ethernet network and the multimedia signal is a composite video signal. The receiving step further includes receiving the video predictive coded multimedia signal from a reserved channel path of the Ethernet network. The performing step further comprises delaying a first line of a video predictive decoded multimedia signal, and subtracting a second line of the video predictive coded multimedia signal from the delayed first line of the video predictive decoded multimedia signal to create the multimedia signal.

The method further includes extracting a synchronization signal from the video predictive coded multimedia signal, where the outputting step outputs the multimedia signal in synchronization with the synchronization signal. The method also includes extracting a synchronization signal while performing the video predictive decoding, buffering the multimedia signal in synchronization with the synchronization signal, and converting the multimedia signal from digital to analog in synchronization with the synchronization signal.

According to another embodiment, the present invention provides a method for transmitting and switching multimedia data over a network by setting a portion of an Ethernet bandwidth for channel allocation, receiving a composite multimedia signal that has an assigned channel allocation priority, and reserving a channel path for the composite multimedia signal. The network comprises an Ethernet network, such as a Fast Ethernet or Gigabit Ethernet network. The reserving step includes reserving a very small portion of the Ethernet bandwidth for channel allocation. The method also incorporates receiving a second multimedia signal and blocking the second multimedia signal. The method additionally includes receiving a second composite multimedia signal, overriding the reserved channel path, and reserving a channel path for the second composite multimedia signal. The method also includes receiving a packet, the packet including a header addressed to a master switch, and a payload including channel allocation priority data. The multimedia signal comprises a video predictive coded composite video signal.

Thus, the present invention provides for the transmission of time sensitive audio/video transmission across a network. For example, a composite 7 MHz video transmission requires 8 bits per pixel to maintain 256 levels. This transmission requires over 140 Mb/s which is prohibitive on a Fast Ethernet network which only provides a bandwidth of 100 Mb/s. The video predictive coding reduces the pixel data down to approximately 4 bits per pixel while maintaining the 256 levels. Accordingly, the transmission of the resulting video only requires a bandwidth of approximately 70-80 Mb/s. Additionally, the present invention provides for dedicated audio/video channel allocation for high priority transmissions. Therefore, the present invention solves the time sensitivity problems associated with transmitting time sensitive, real time, and continuous data across a Fast Ethernet or faster Ethernet network (such as a Gigabit or 10 Gigabit Ethernet network). Accordingly, a video signal is received, transmitted, and outputted to and from the Ethernet network in real time.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
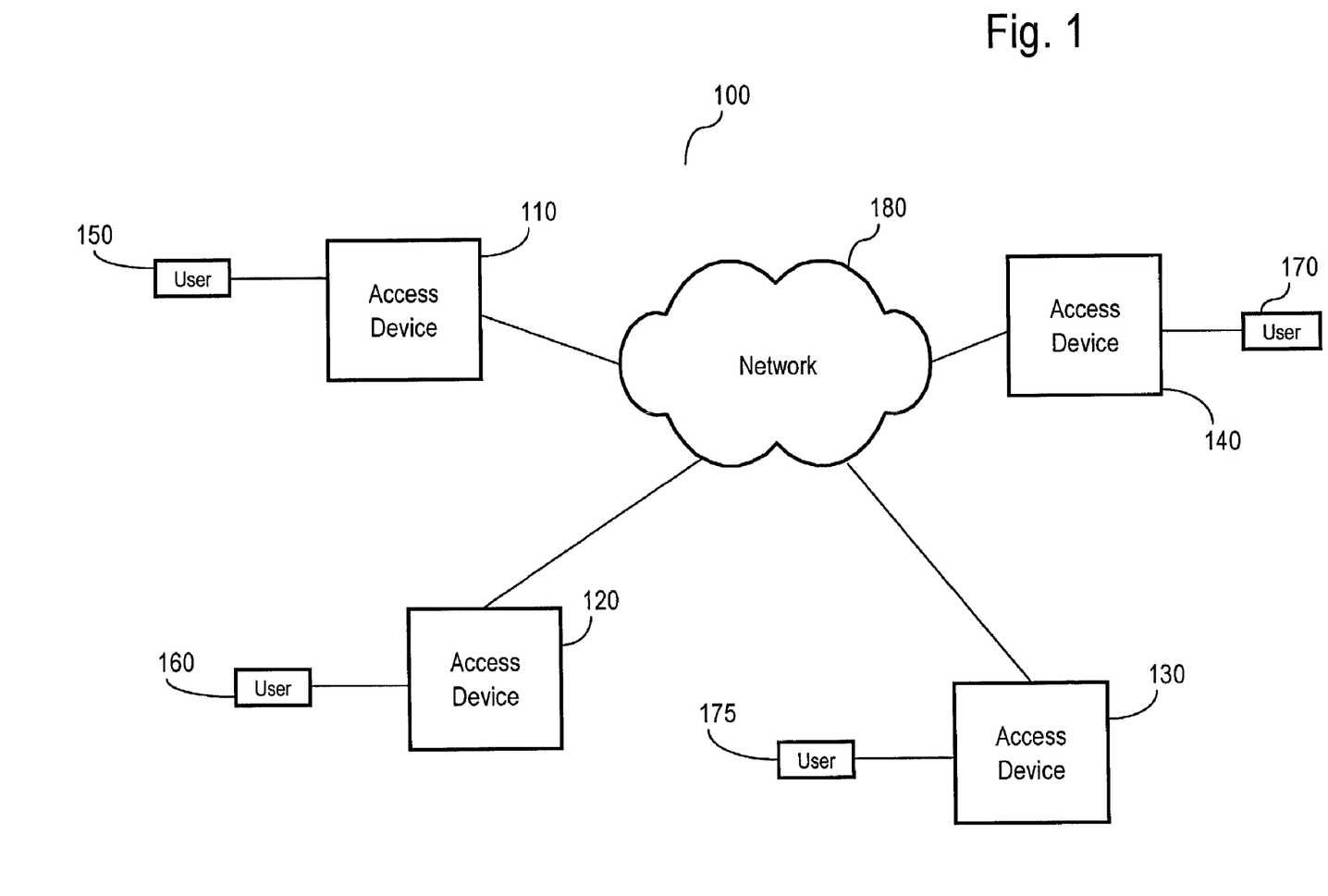
FIG. 1 is an exemplary illustration of a system for uncompressed IP multimedia data transmission and switching according to a preferred embodiment.

FIG. 1 is an exemplary illustration of a system 100 for uncompressed IP multimedia data transmission and switching according to a preferred embodiment. The system 100 includes users 150, 160, 170 and 175, access devices 110, 120, 130, and 140, and a network 180. Users 150, 160, 170 and 175 are users such as video/audio sources, data terminals, video monitors, or the like. Network 180 is a network such as, a Fast/Gigabit/10 Gigabit Ethernet network, or the like. The system 100 provides for interactivity between the access devices.

In operation, a user 150, such as a video camera, transmits multimedia data such as composite video to the access device 110. The access device 110 reserves a channel path across the network 180 during allocated bandwidth for channel allocation. The access device 110 performs video predictive coding on the video signal and continuously transmits the video in real time to another access device 140. The receiving access device 140 performs video predictive decoding on the video signal and outputs the data to a user 170 such as a video monitor.

Figure 2:
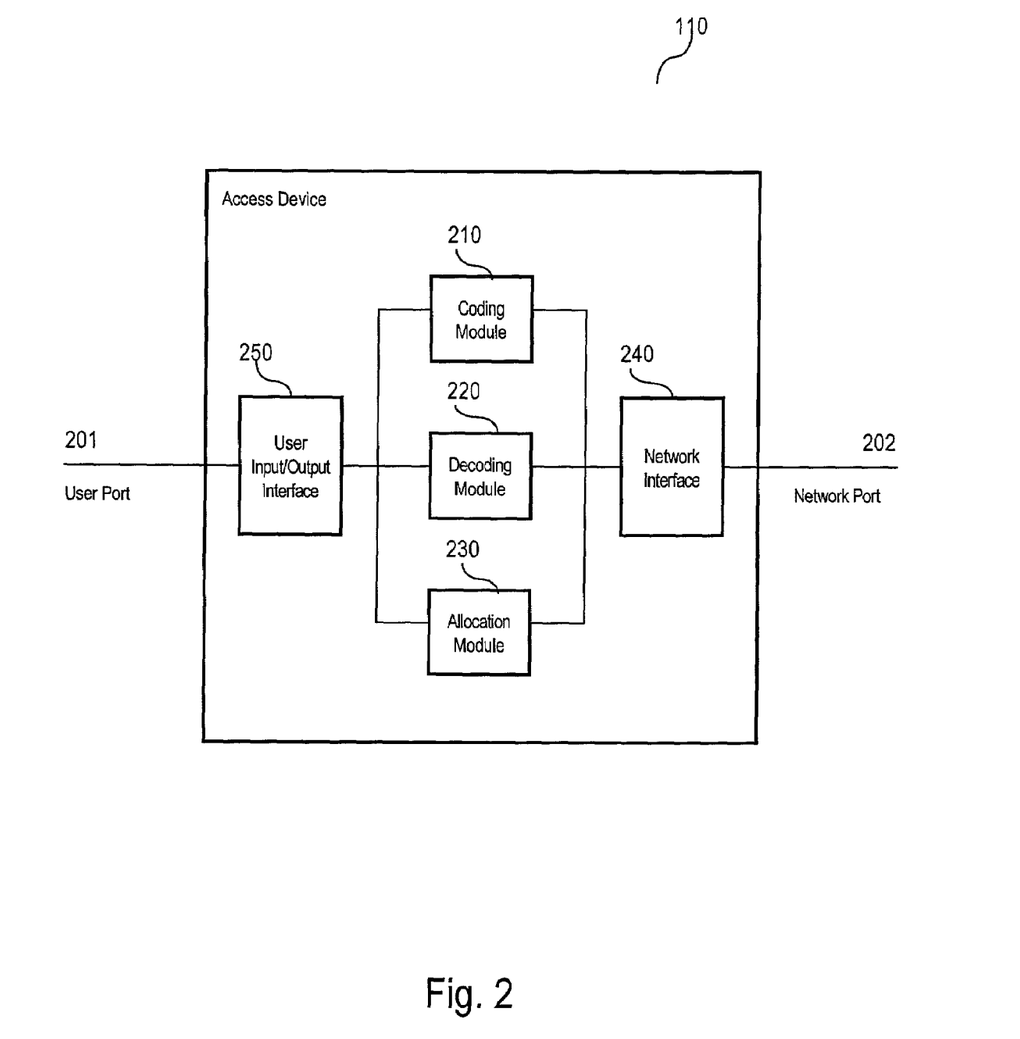
FIG. 2 is an exemplary illustration of an access device according to a preferred embodiment.

FIG. 2 is an exemplary illustration of an access device 110 according to a preferred embodiment. The access device includes ports 201 and 202, a coding module 210, a decoding module 220, an allocation module 230, a network interface 240, and a user input/output interface 250. The port 201 is a user port which receives or outputs a multimedia signal and/or a video signal such a composite video signal. The network port 202 outputs the data to a network or receives data from a network such as a Fast Ethernet network. The user port 201 is coupled to user input/output interface 250 which, in turn, is coupled to the coding module 210, the decoding module 220, and/or the allocation module 230. The network port 202 is coupled to the network interface module 240.

The coding module 210 is a video predictive coding module that performs video predictive coding on an inputted video signal. In particular, the coding module 210 uses the relationship between lines in a video signal to reduce the data content of the video signal before transmission to the network interface 240. Subsequent lines of the video signal can be recovered from current and previous lines and/or subsequent lines can be used to recover previous lines. For example, when a drastic change occurs between lines, a subsequent line can be used to provide information to assist in recovering a line that encountered the drastic change. The decoding module 220 is a video predictive decoding module. The decoding module 220 performs video predictive decoding on a video predictive coded signal received from the network port 202. The allocation module 230 reserves a channel of the network 180 for transmitting the video predictive coded signal according to the priority of the video predicted coded signal.

Figure 3:
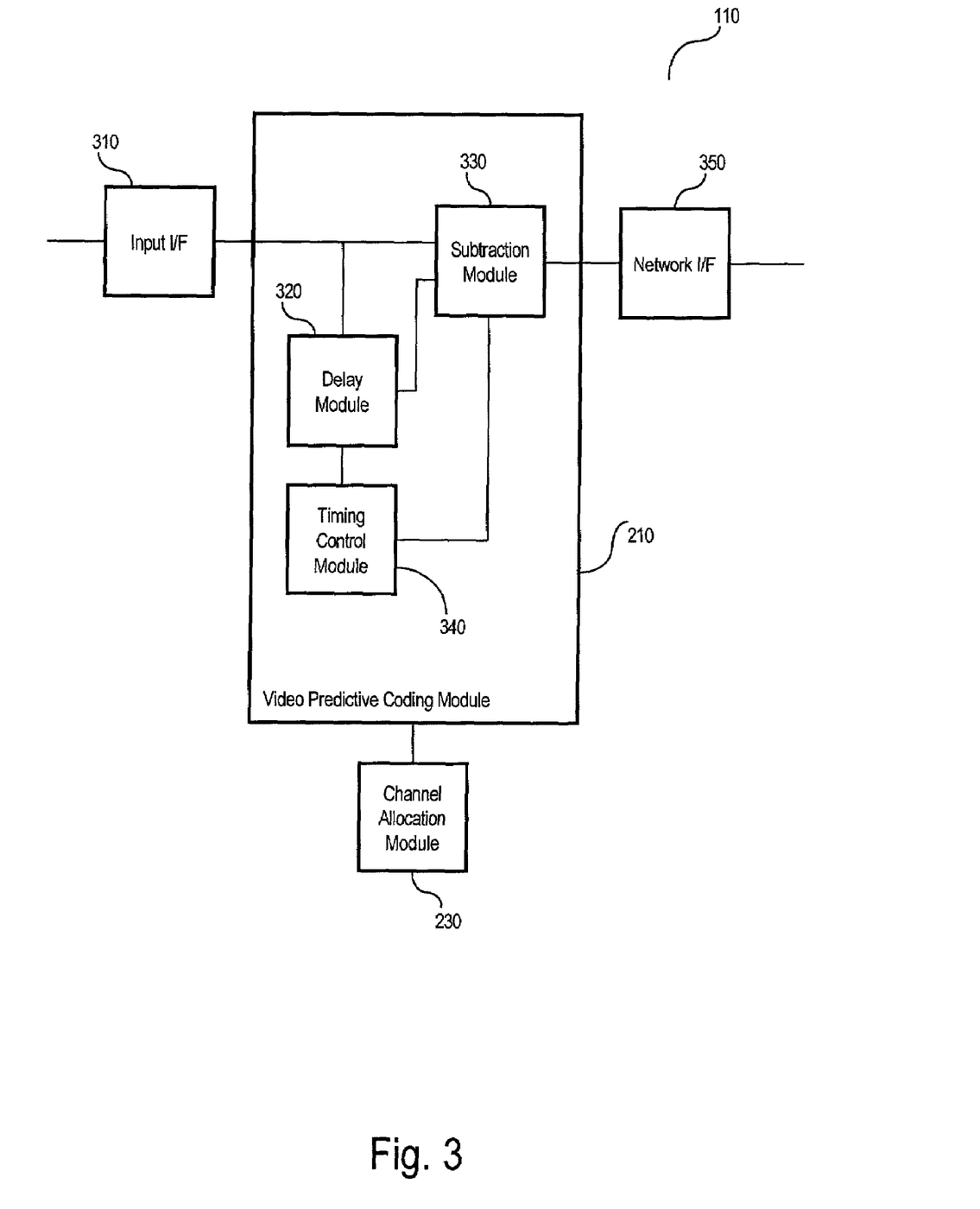
FIG. 3 is an exemplary block diagram of an access device according to one embodiment.

FIG. 3 is an exemplary block diagram of an access device 110 according to one embodiment. The access device 110 includes a video predictive coding module 210, an input interface 310, a delay module 320, a subtraction module 330, a timing control module 340, a network interface 350, and a channel allocation module 230. In operation, the input interface 310 receives a video signal from the user port 201 (See FIG. 2). The delay module 320 delays a line of the video signal. The subtraction module 330 subtracts the subsequent line of the video signal from the delayed line of the video signal. The timing control module 340 controls the timing of the circuitry of the video predictive coding module 210. The channel allocation module 230 reserves a channel of the Ethernet network for transmitting a video predictive coded signal according to a priority of the video predictive coded signal. The network interface 350 outputs the video predictive coded signal to the network 180. The video predictive coded signal is outputted in real time with reception of the video signal. In particular, the video predictive coded signal is outputted substantially concurrently with the reception of the video signal. The video predictive coded signal can include a plurality of lines having a plurality of pixels.

Figure 4:
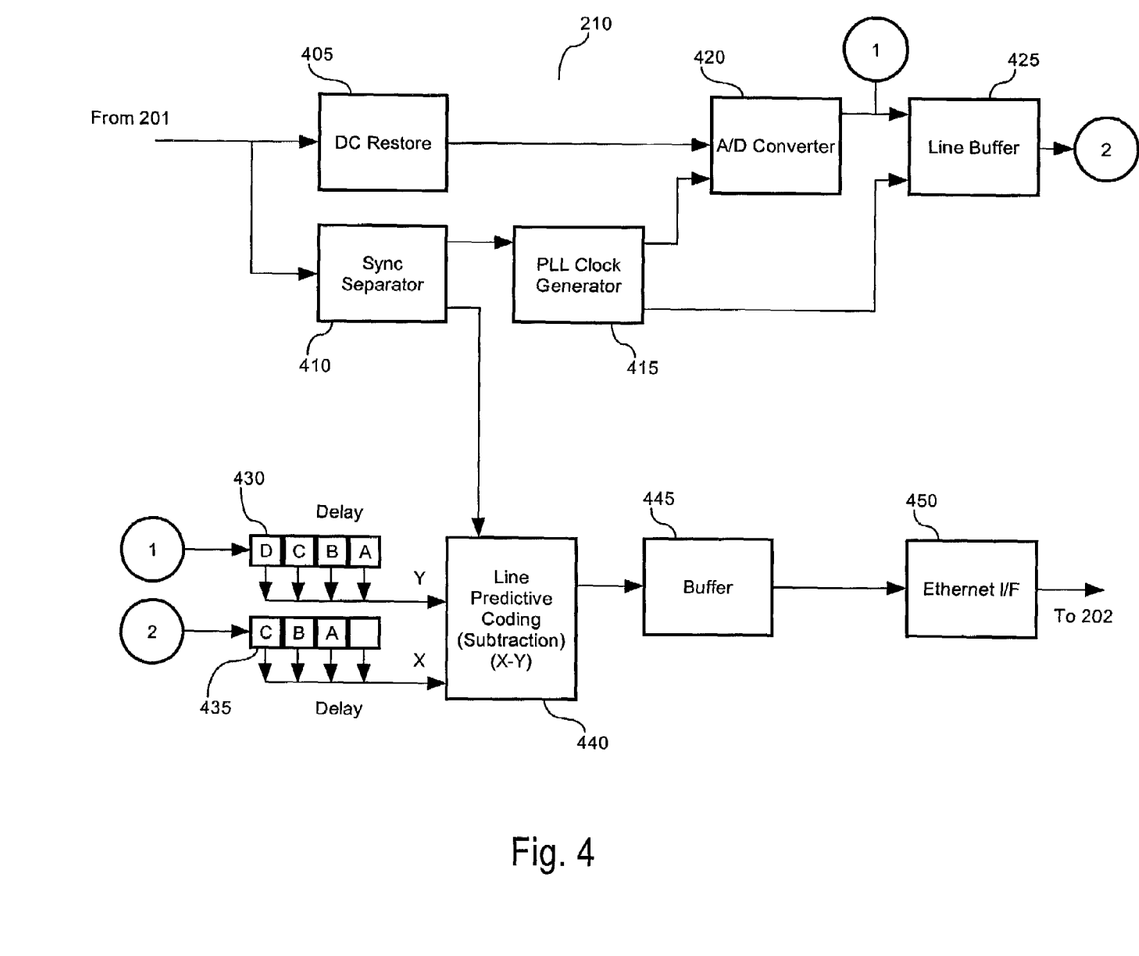
FIG. 4 is an exemplary block diagram of a coding module according to a preferred embodiment.

FIG. 4 is an exemplary block diagram of a coding module 210 according to a preferred embodiment. The coding module 210 includes DC restore circuitry 405, a synchronization separator 410, a phase lock loop clock generator 415, an analog to digital converter 420, a line buffer 425, delay circuitry 430 and 435, line predictive coding circuitry 440, a buffer 445, and an Ethernet interface 450. In operation, the DC restore circuitry 405 conditions an analog video signal received from a video source from a port 201 (See FIG. 2). For example, the DC restore circuitry 405 conditions a video signal received from a video camera. The synchronization separator 410 and the phase lock loop clock generator 415 act as timing control for the coding module 210. In particular, the synchronization separator 410 and the phase lock loop clock generator 415 control the timing of the video predictive coding module 210 for control synchronization or other synchronization purposes of the video predictive coding module 210. The analog to digital converter 420 converts the video signal into a digitized video signal. The digitized video signal comprises multiple lines including multiple pixels. Each pixel can be represented by, for example, 8 bits of data to achieve 256 levels. The line buffer 425 creates a delayed line of the video signal. The delayed line of the video signal comprises a plurality of pixels. An undelayed line of the video signal enters the input buffer 430 of the line predictive coding (or subtraction) circuit 440. A delayed line of the video signal enters the input buffer 435 of the line predictive coding (or subtraction) circuit 440. Input buffers 430 and 435 act as a buffer for the line predictive coding circuit 440. The line predictive coding circuitry 440 performs subtraction on the received digitized video signals. In particular, the line predictive coding circuitry 440 subtracts the digitized video signal received from input buffer 430 from the delayed digitized video signal received from input buffer 435. Thus, the line predictive coding circuitry 440 subtracts a subsequent line of the video signal from a delayed line of the video signal. For example, if the original digitized video signal includes pixels of 8 bits each, the resulting transmitted video signal includes pixels of approximately 4 bits each. Thus, for example, video can be transmitted in real time over a Fast Ethernet network because the resulting coded digitized video signal requires less than 100 Mb/s. In a preferred embodiment, a video signal can be transmitted in real time at a approximately 70-80 Mb/s. The buffer 445 is used to buffer the signal for output. The Ethernet interface 450 outputs the video predictive coded signal to an Ethernet network.

Figure 5:
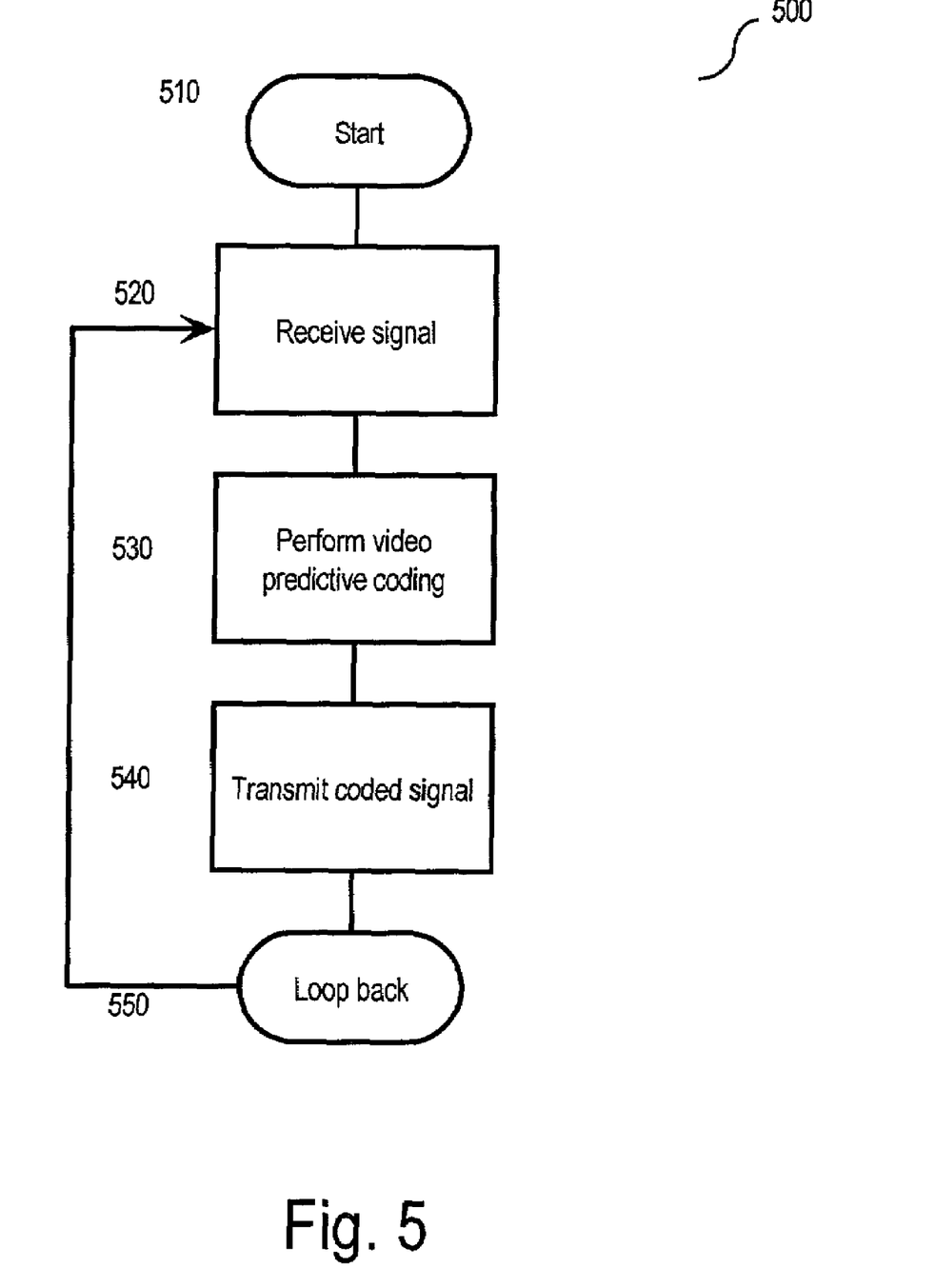
FIG. 5 is an exemplary illustration of a flowchart outlining the operation of the coding module according to a preferred embodiment.

FIG. 5 is an exemplary illustration of a flowchart outlining the operation of the coding module 210 according to a preferred embodiment. The flowchart starts in step 510. In step 520, the coding module 210 receives a signal such as a multimedia signal. In particular, the coding module 210 receives a composite video signal. In step 530, the coding module 210 performs video predictive coding on the received signal to create a video predictive coded signal. The video predictive coding is preferably done by delaying a line of the video signal and subtracting a subsequent line of the video signal from the delayed line of the video signal. Step 530 can include extracting a synchronization signal from the video signal to perform video predictive coding in synchronization with the synchronization signal. Additionally, the video signal is converted from analog to digital in synchronization with the synchronization signal, and the video signal is buffered in synchronization with the synchronization signal. In step 540, the coding module 210 transmits the coded signal across the network, such as a Fast Ethernet network. The coded signal is transmitted substantially concurrently with performing video predictive coding on the signal. In step 550 the flowchart returns to step 520. In a preferred embodiment, the resulting video predictive coded signal is represented by half the number of sampling bits per analog to digital sample point of the video signal.

Figure 6:
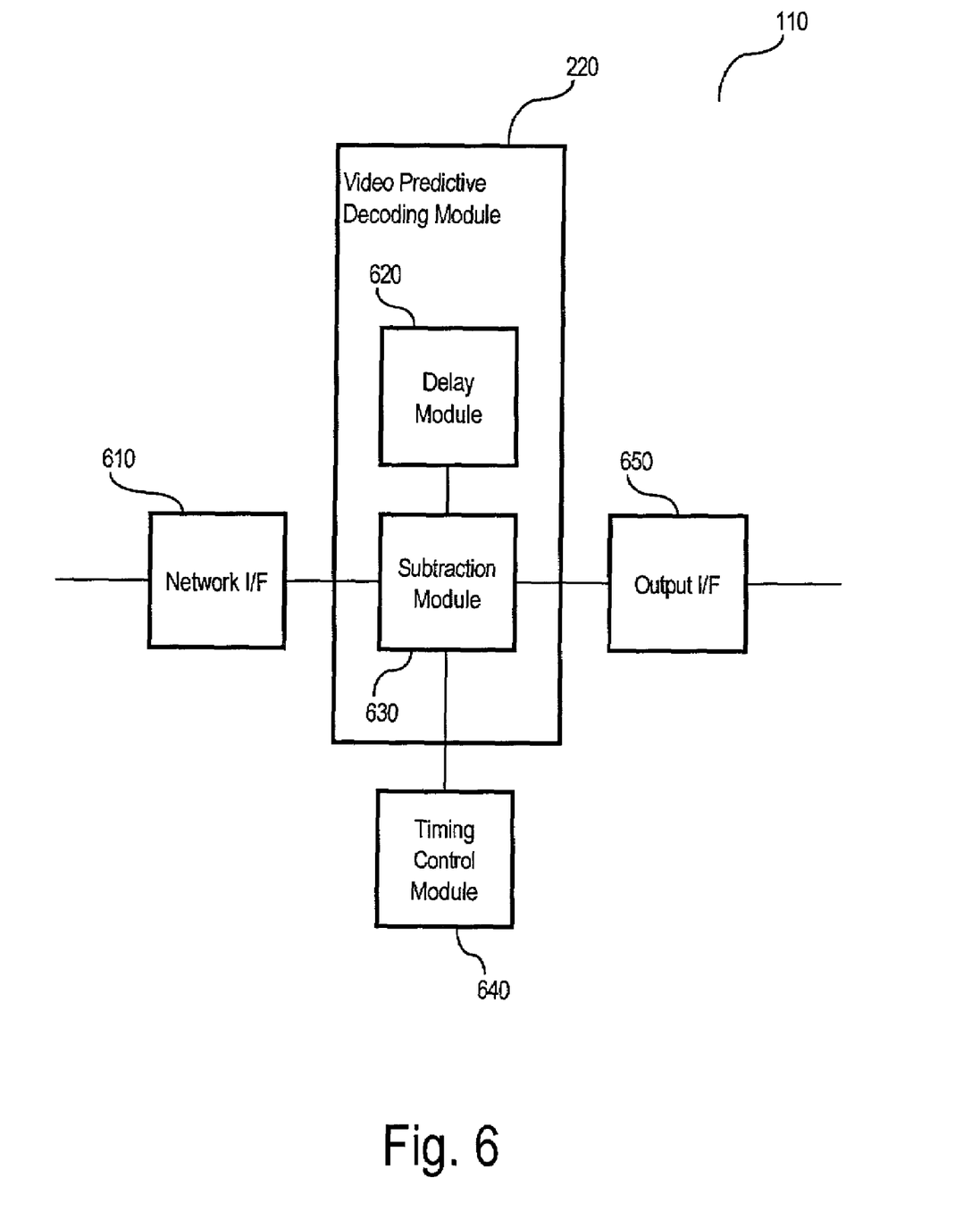
FIG. 6 is an exemplary illustration of an access device according to another embodiment.

FIG. 6 is an exemplary illustration of an access device 110 according to another embodiment. The access device 110 includes a video predictive decoding module 220, a network interface 610, a delay module 620, a subtraction module 630, a timing control module 640, and an output interface 650. The video predictive decoding module 220 includes the delay module 620 and the subtraction module 630. In operation, the network interface 610 receives a video predictive coded signal from the network 180. The subtraction module 630 subtracts a subsequent line of the video predictive coded signal from a delayed line of the video predictive decoded signal. The delay module 620 delays a line of the video predictive decoded signal to create the delayed line. The timing control module 640 controls the timing of the circuitry for the output of the video predictive decoding module 220. The output interface 650 outputs a video predictive decoded signal in real time to a user 170 such as a video monitor.

Figure 7:
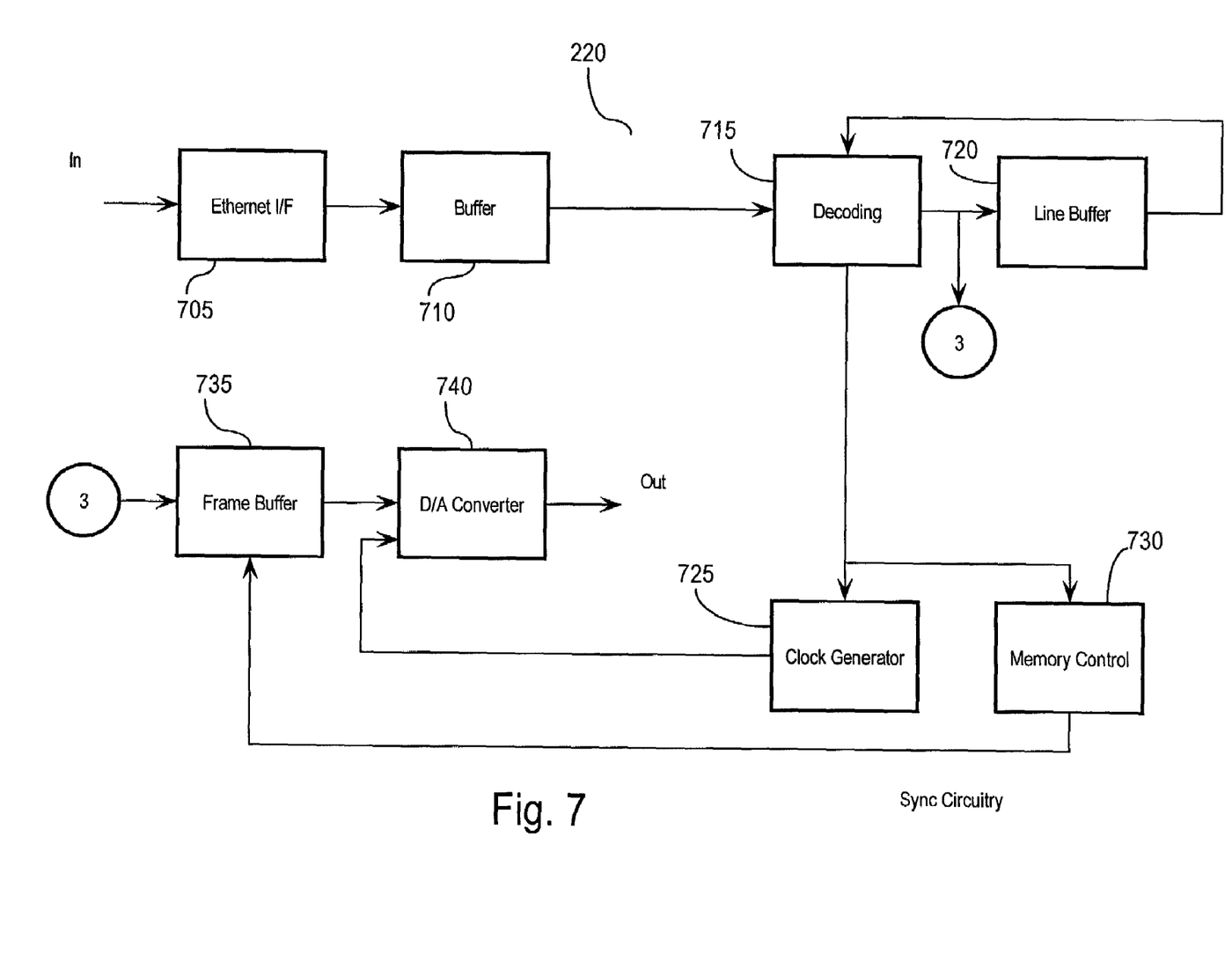
FIG. 7 is an exemplary illustration of a decoding module according to a preferred embodiment.

FIG. 7 is an exemplary illustration of a decoding module 220 according to a preferred embodiment. The decoding module 220 includes an Ethernet interface 705, a buffer 710, decoding circuitry 715, a line buffer 720, a clock generator 725, memory control circuitry 730, frame buffer circuitry 735, and a digital to analog converter 740. In operation, the Ethernet interface 705 provides an interface for receiving a video predictive coded signal from the Ethernet network 180. The buffer 710 acts as a buffer for buffering the video predictive coded signal. The decoding circuitry 715 subtracts a line of the received video predictive coded signal from a delayed line of the video predictive decoded signal. Line buffer 720 acts as a delay module for delaying a line of the video predictive decoded signal to create the delayed line of the video predictive decoded signal. The clock generator 725 and the memory control 730 act as synchronization circuitry to control the timing and synchronization of the frame buffer 735 and the digital to analog converter 740 in synchronization with the other circuitry. In particular, the memory control circuitry 730 controls the frame buffer 735 and it can also be used for decoding when more than one line is used to recover a line being decoded. The frame buffer 735 buffers the decoded video signal. The digital to analog converter 740 converts the video predictive decoded signal into an output video signal for outputting to a user 170.

Figure 8:
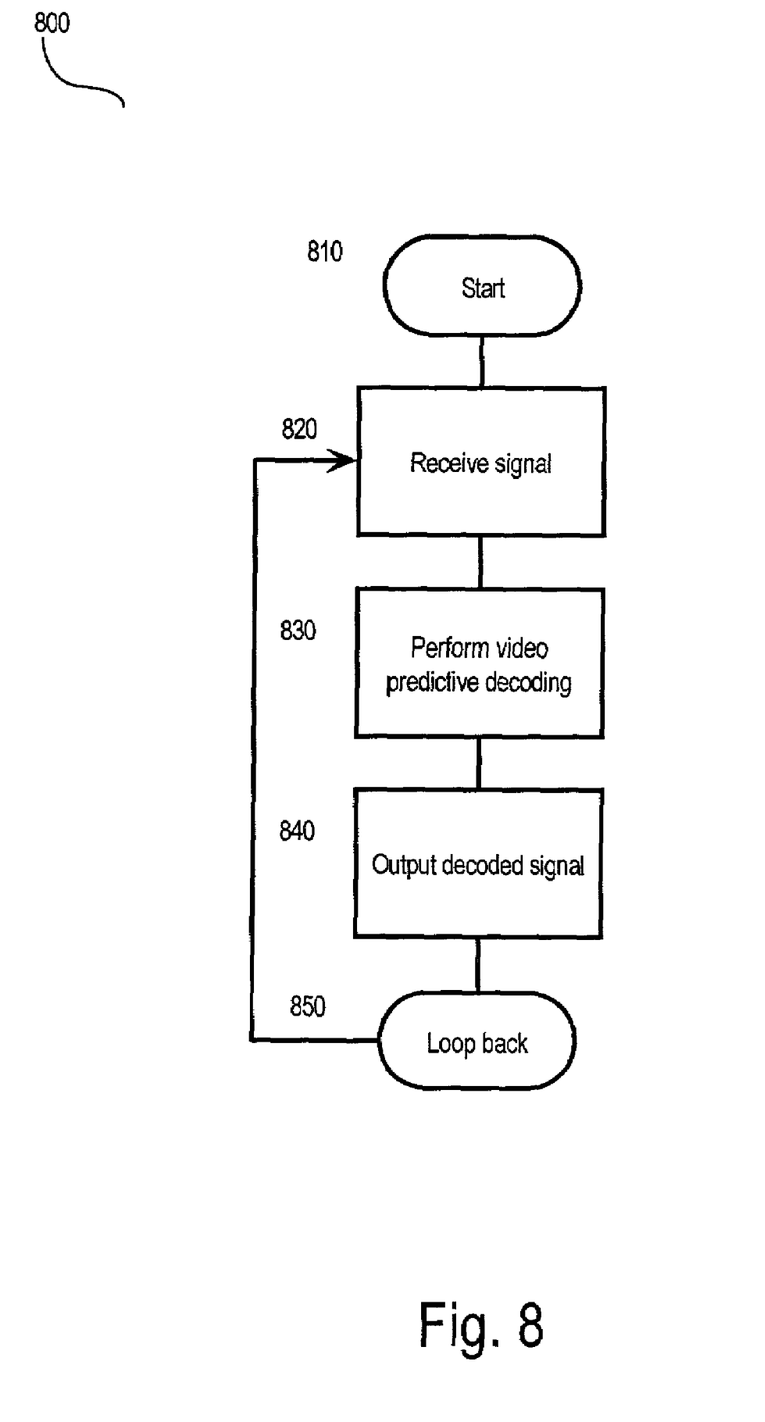
FIG. 8 is an exemplary flowchart outlining the operation of the decoding module.

FIG. 8 is an exemplary flowchart outlining the operation of the decoding module 220. In step 810 the flowchart starts. In step 820, the decoding module 220 receives a signal such as a video predictive coded signal, such as, for example a video predictive coded video signal. The signal is received across an Ethernet network 180 from an access device 110 utilizing a coding module 210. In step 830, the decoding module 220 performs video predictive decoding on the received video predictive coded signal to recover the video signal. Step 830 can include delaying a first line of the video predictive coded signal and subtracting a second line of the video predictive coded signal from the delayed first line of the video predictive coded signal to recover the video signal. Video predictive decoding also includes extracting a synchronization signal from the video predictive coded signal so the signal is outputted in synchronization with the synchronization signal. The signal is buffered and converted from digital to analog in synchronization with the synchronization signal. In step 840, the decoding module 220 outputs the decoded signal in a manner substantially concurrently with steps 820 and 830. In step 850, the flowchart loops back to step 820.

Figure 9:
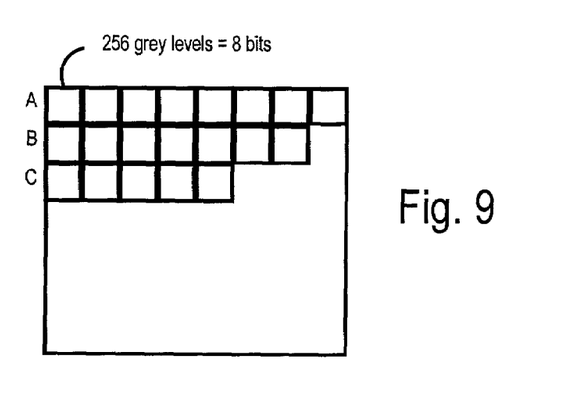
FIG. 9 is an exemplary illustration of a digitized video signal.

FIG. 9 is an exemplary illustration of a digitized video signal. The digitized video signal includes multiple lines A, B, C, etc. that include multiple pixels. For a composite video signal, each pixel includes 256 levels. Thus, each pixel can be represented by 8 bits.

Figure 10A:
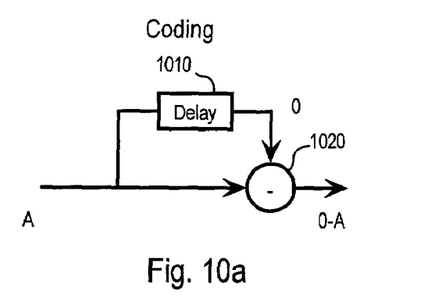
FIGS. 10a-10f are exemplary illustrations of video predictive coding and decoding according to a preferred embodiment.
Figure 10B:
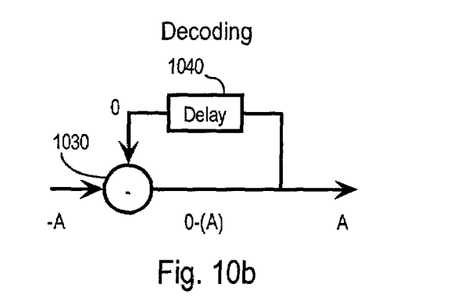
Figure 10C:
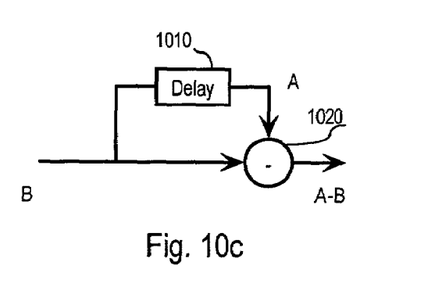
Figure 10D:
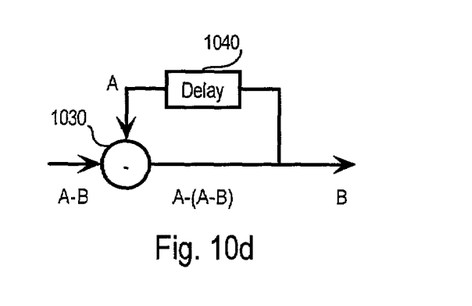
Figure 10E:
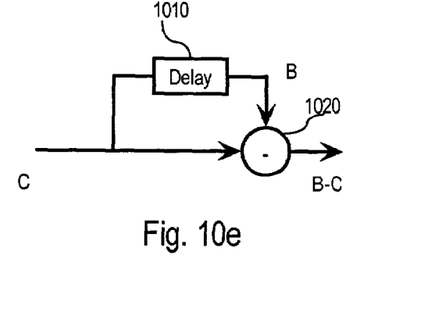
Figure 10F:
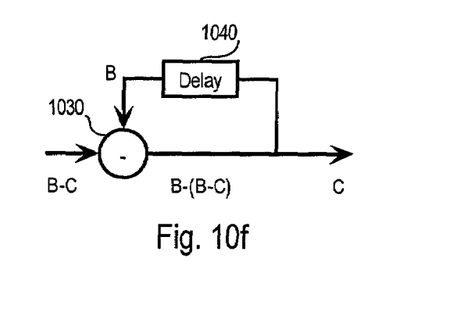

FIGS. 10*a*-10*f* are exemplary illustrations of video predictive coding and decoding according to a preferred embodiment. Coding circuitry can include delay circuitry 1010 and subtraction circuitry 1020. Decoding circuitry can include subtraction circuitry 1030 and delay circuitry 1040. In operation, a line A comprising pixels enters the coding circuitry. The subtraction circuitry 1020 subtracts each pixel of the line from a line present in the delay circuitry 1010 (O at this point). Next, the signal A is transmitted across an Ethernet network 180 and received by the decoding circuitry. The subtraction circuitry 1030 subtracts the received line A data from the line present in the delay circuitry 1040 (O at this point). Then, as shown, in FIG. 10*c*, line A is present in the delay circuitry 1010. Line B is subtracted from line A by subtraction circuitry 1020. The resulting signal is sent across a Fast Ethernet network and is received by decoding circuitry as illustrated in FIG. 10*d*. In FIG. 10*d*, the decoded line A is present in the delay circuitry 1040. The subtraction circuitry 1030 subtracts the received signal A-B from the delayed signal A to completely restore an output line B. Then, as shown in FIG. 10*e*, line B is present in the delay circuitry 1010. Line C is subtracted from line B by subtraction circuitry 1020. The resulting signal is sent across a Fast Ethernet network and is received by decoding circuitry as illustrated in FIG. 10*f*. In FIG. 10*f*, the decoded line B is present in the delay circuitry 1040. The subtraction circuitry 1030 subtracts the received signal B-C from the delayed signal B to completely restore an output line C. Because the difference of video line information (i.e., A-B, B-C, etc.) is sent, the number of bits representing the difference of a video line is statistically approximated to half of the bits representing the video line without subtraction. In other words, if each video line pixel is represented by 8 bits, the average video line pixel after subtraction can be approximated by 4 bits.

Figure 11:
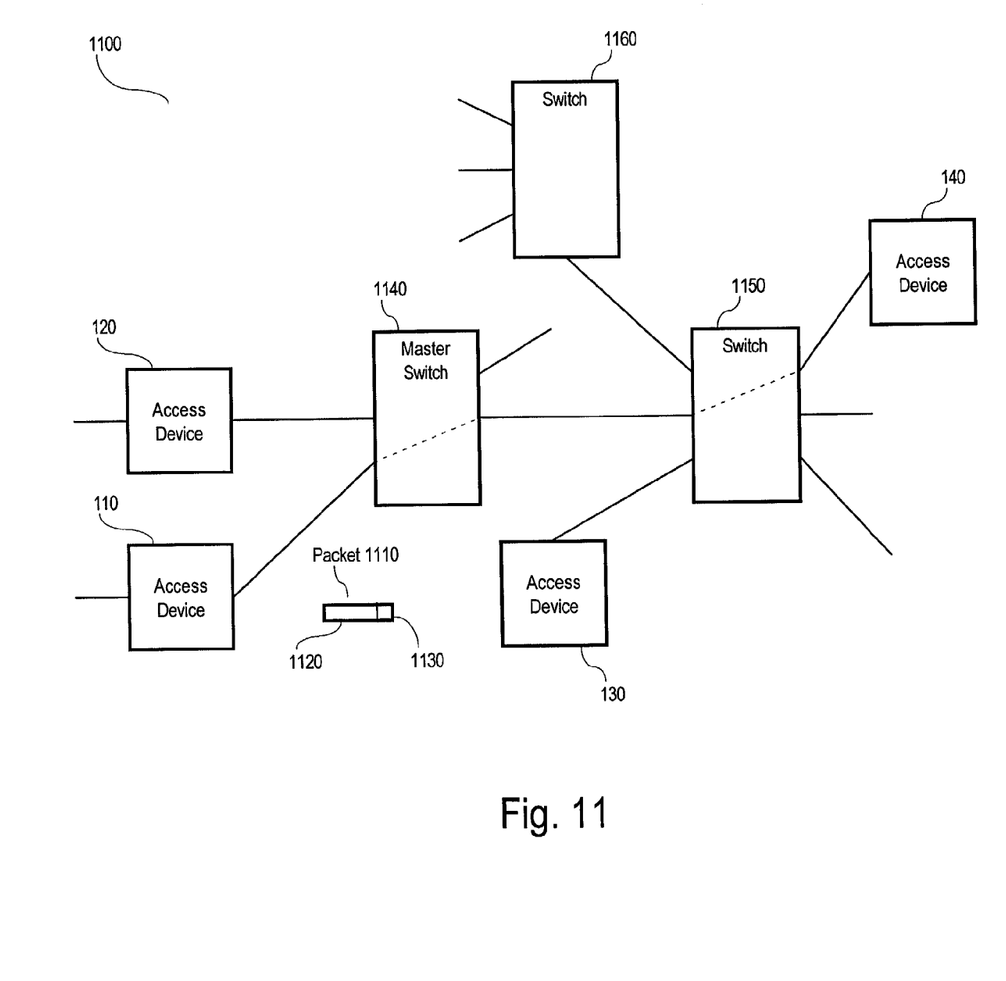
FIG. 11 is an exemplary illustration of a system utilizing data allocation according to a preferred embodiment.

FIG. 11 is an exemplary illustration of a system 1100 utilizing data allocation according to a preferred embodiment. The system includes access devices 110, 120, 130, and 140, a channel allocation priority packet 1110 including a payload 1120 and a header 1130, a master Ethernet switch 1140, and Ethernet switches 1150 and 1160. The access devices transmit multiple formats of data including packetized data and time-sensitive data such as video data. The system 1100 reserves a portion of Ethernet bandwidth for real-time audio/video channel allocation. In particular, the system 1100 reserves a portion of Fast Ethernet 100 Mb/s for the channel allocation packet 1110. For example, the system 1100 reserves 100 kb/s for channel allocation packet 1110. The system 1100 operates like a circuit switched system, but not necessarily on a first come, first served basis. For example, channel allocation can be based on the highest priority transmitted data or based on a chosen rule. For example, more important video data, such as security video, can take priority over lower priority video transmissions. The channel allocation priority packet 1110 includes a header 1130 addressed to the master switch 1140, and a payload 1120 that includes channel allocation priority data. For example, the channel allocation priority data includes a priority code, priority definitions, or the like. The switches 1140, 1150 and 1160 are Fast Ethernet or faster Ethernet switches. The master switch 1140 receives the packet 1110 and reserves a channel path for high priority video data. The master switch 1140 reserves the path by allocating the path in the master switch and in slave switches such as switch 1150. Thus, time-sensitive data is transmitted from the access device 110 to the access device 140 without interruption. The switches 1140 and 1150 thus block lower priority data. The system 1110 solves time-sensitivity problems encountered when transmitting time-sensitive data such as continuous video or multimedia data. The system 1110 assists in determining the priority of transmitted data. In particular, time-sensitive video data takes priority over packetized data.

Figure 12:
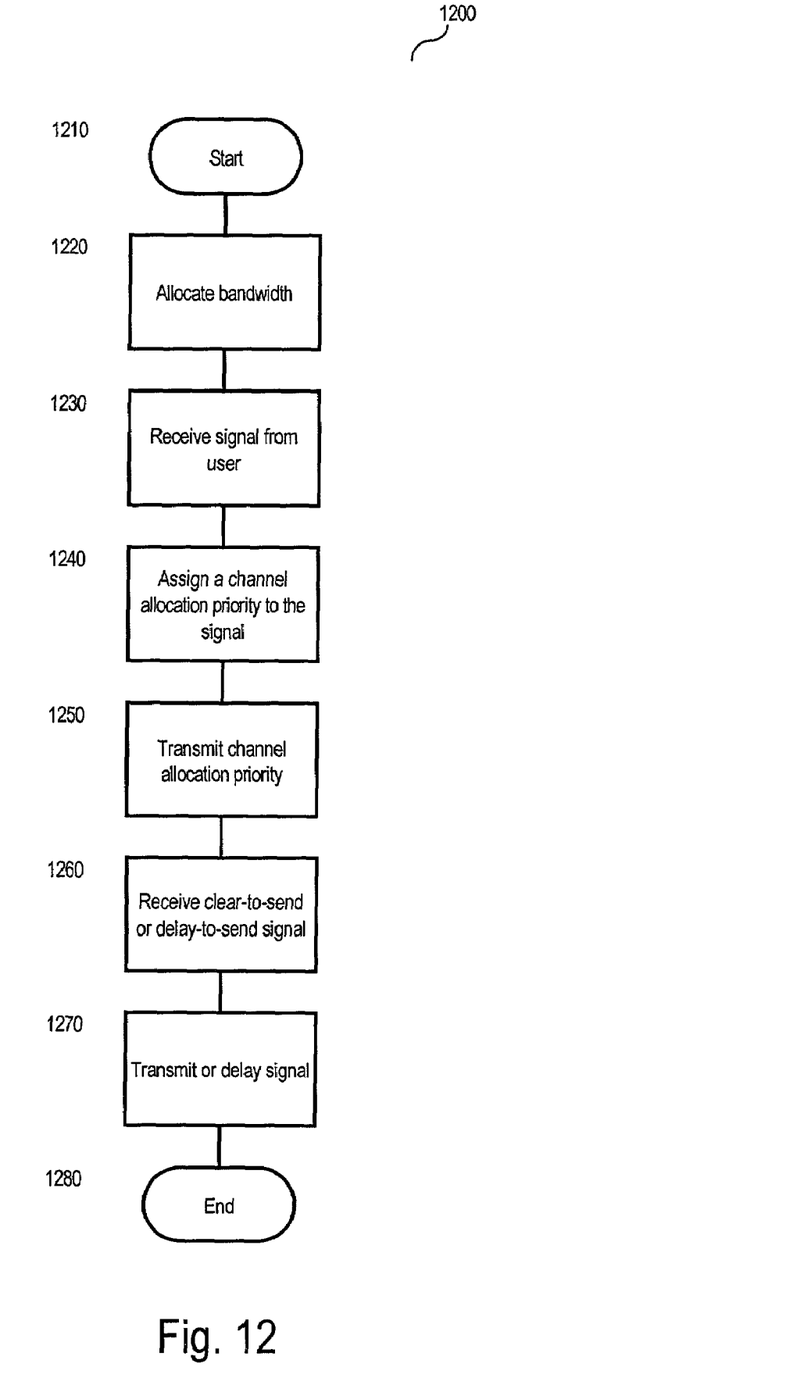
FIG. 12 is an exemplary flowchart outlining the operation of the allocation module of the access device according to a preferred embodiment.

FIG. 12 is an exemplary flowchart 1200 outlining the operation of the allocation module 230 of the access device 110 according to a preferred embodiment. In step 1210 the flowchart begins. In step 1220, bandwidth is allocated by reserving a portion of Ethernet bandwidth for channel allocation. For example, 100 kb/s of 100 Mb/s of Fast Ethernet bandwidth is reserved for channel allocation. In step 1230 a video signal is received that has an assigned channel allocation priority. The video can be a multimedia (audio/video/data) signal, a digital video signal, a composite video signal, or the like. In step 1240, the channel allocation priority is assigned to the video signal. In step 1250 the access device transmits the channel allocation priority to the master switch 1140 in the reserved portion of the bandwidth. In step 1260 the allocation module 230 receives a clear-to-send or delay-to-send signal form the master switch 1140. In step 1270, the allocation module transmits or delays the video signal based on the signal from the master switch 1140. In step 1280 the flowchart ends.

Figure 13:
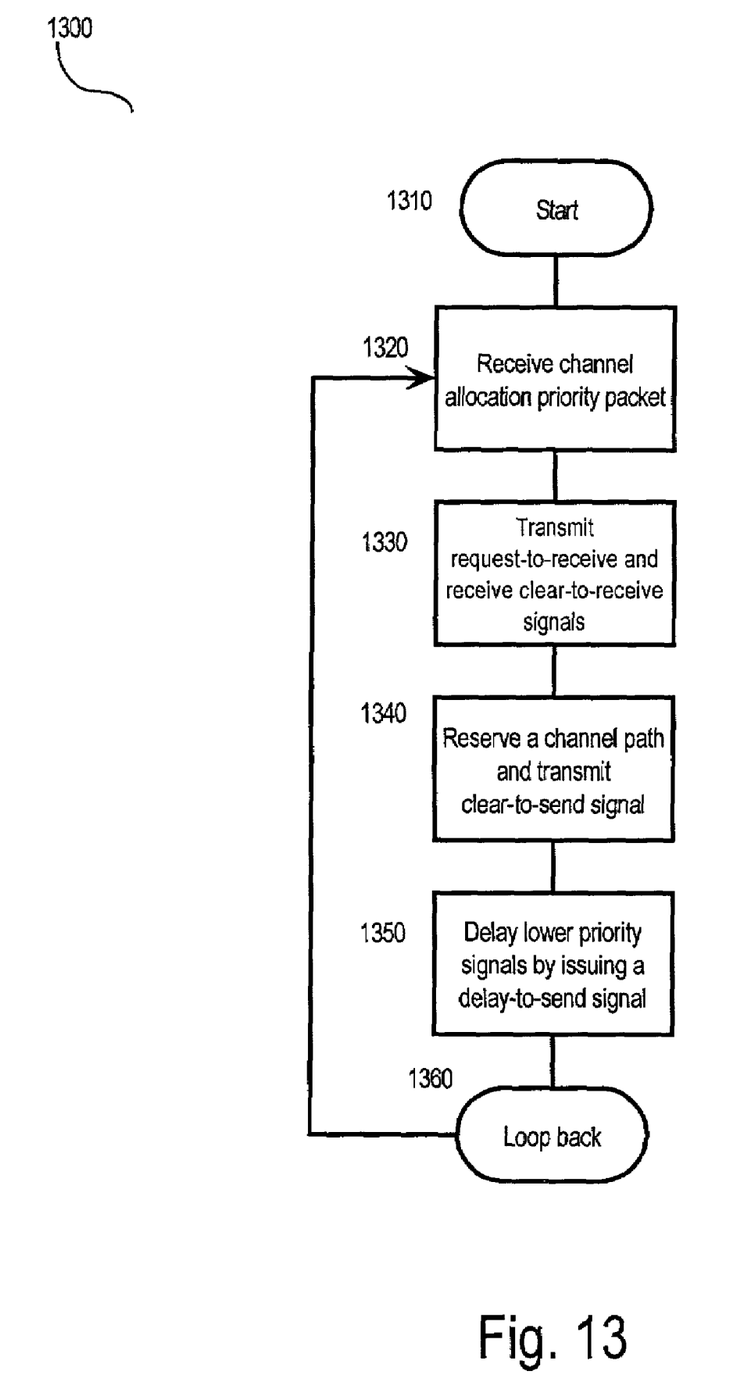
FIG. 13 is an exemplary flowchart outlining the operation of a switch in response to the allocation module of the access device according to a preferred embodiment.

FIG. 13 is an exemplary flowchart 1300 outlining the operation of a master switch 1140 in response to the allocation module 230 of the access device 110 according to a preferred embodiment. In step 1310 the flowchart begins. In step 1320 a master switch 1140 receives a channel allocation priority packet 1110. The packet includes a header 1130 addressed to the master switch 1140 and a payload 1120 including channel allocation priority data. In step 1330, the master switch 1140 transmits a request-to-receive signal to the allocation module 230 of the access device 140. When a user at the access device 140 is ready to receive the video signal from the user at the access device 120, the allocation module 230 of the access device 140 sends a clear-to-receive signal back to the master switch 1140. In step 1340, the master switch reserves a channel path for the video signal to be sent by the access device 120, and transmits a clear-to-send signal to the allocation module 230 of the access device 120. In step 1350, when the master switch 1140 does not receive a clear-to-receive signal from the access device 140 in a pre-specified time interval or does not find an available channel path (based on the priority of the video signal) for the video signal to be sent by the access device 120, it issues delay-to-send signal to the allocation module 230 of the access device 120. In step 1360, the flowchart loops back to step 1320.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. An apparatus for transmitting uncompressed video data across a network, comprising:
    a video input that receives an uncompressed video signal;
    a video predictive coding module coupled to the video input, wherein the video predictive coding module performs video predictive coding on the video signal in real time to create a video predictive coded signal;
    wherein the predictive coding comprises:
        delaying a first line of the composite video signal, and
        subtracting a second line of the composite video signal from the first line of the composite video signal to create the video predictive coded video signal;
    a delay module coupled to the video input to delay a line of the uncompressed video signal;
    a subtraction module coupled to the delay module, wherein the subtraction module subtracts a subsequent line of the video signal from the delayed line of the video signal; and
    a network interface coupled to the video predictive coding module and coupled to the network, wherein the network interface transmits the video predictive coded signal across the network concurrently with the video predictive coding module performing video predictive coding in real time.

2. The apparatus for transmitting uncompressed video data according to claim 1, wherein the network comprises at least one of a Fast Ethernet network and an Ethernet network faster than Fast Ethernet and the video signal comprises at least one of a composite and digital video signal.

3. The apparatus for transmitting uncompressed video data according to claim 1, wherein the delay module comprises a line buffer and wherein the line buffer delays a line of the video signal to create the delayed line of the video signal.

4. The apparatus for transmitting uncompressed video data according to claim 1, further comprising a timing control module coupled to the video input and coupled to the video predictive coding module, wherein the timing control module controls the timing of the video predictive coding module.

5. The apparatus for transmitting uncompressed video data according to claim 1, further comprising a channel allocation module, wherein the channel allocation module reserves a channel of the Ethernet network for transmitting the video predictive coded signal according to the priority of the video predictive coded signal.

6. The apparatus for transmitting uncompressed video data according to claim 1, further comprising an analog to digital converter, wherein the video signal comprises a digitized video signal and the analog to digital converter converts an input video signal into the digitized video signal.

7. The apparatus for transmitting uncompressed video data according to claim 1, wherein the video predictive coded signal comprises at least one line comprising a plurality of pixels.

8. An apparatus for receiving uncompressed video data, comprising:
    a network interface that receives a video predictive coded signal from a network;
    a subtraction module coupled to the network interface;
    a video predictive decoding module coupled to the network interface, wherein the video predictive decoding module performs video predictive decoding on the video predictive coded signal in real time to create a video predictive decoded signal;

wherein the predictive decoding comprises:
  delaying a line of a decoded video signal, and
  subtracting a line of the video predictive coded multimedia signal from the line of the decoded video signal to create the video predictive decoded video signal;
a delay module coupled to the subtraction module, wherein the subtraction module subtracts a subsequent line of the video predictive coded signal from a line of the video predictive decoded signal delayed by the delay module; and
a video output coupled to the video predictive decoding module, wherein the video output outputs the video predictive decoded signal in real time.

9. The apparatus for receiving uncompressed video data according to claim 8, wherein the network comprises at least one of a Fast Ethernet and higher network and the video signal comprises at least one of a composite and digital video signal.

10. The apparatus for receiving uncompressed video data according to claim 8, wherein the delay module comprises a line buffer and wherein the line buffer delays a line of the video predictive decoded signal to create a delayed line of the video predictive decoded signal.

11. The apparatus for receiving uncompressed video data according to claim 8, further comprising a timing control module coupled to the video output and coupled to the video predictive decoding module, wherein the timing control module controls the timing of the video output.

12. The apparatus for receiving uncompressed video data according to claim 11, wherein the timing control module comprises:
  a clock generation module coupled to the video predictive decoding module; and
  a memory control module coupled to the video predictive decoding module.

13. The apparatus for receiving uncompressed video data according to claim 8, further comprising a channel allocation module, wherein the channel allocation module reserves a channel of the Ethernet network for transmitting the video predictive coded signal according to the priority of the video predictive coded signal.

14. The apparatus for receiving uncompressed video data according to claim 8, further comprising a digital to analog converter, wherein the digital to analog converter converts the video predictive decoded signal into an output video signal.

15. The apparatus for receiving uncompressed video data according to claim 8, wherein the video predictive coded signal comprises at least one line comprising a plurality of pixels.

16. A method of transmitting uncompressed multimedia data over a network comprising:
  using an access device to receive an uncompressed multimedia signal;
  performing video predictive coding on the multimedia signal to create a video predictive coded multimedia signal, wherein the predictive coding comprises:
    delaying a first line of the composite video signal, and
    subtracting a second line of the composite video signal from the first line of the composite video signal to create the video predictive coded video signal; and
  transmitting the video predictive coded multimedia signal over the network substantially concurrently with the performing step.

17. The method according to claim 16, wherein the network comprises at least one of a Fast Ethernet network and an Ethernet network faster than Fast Ethernet and the uncompressed multimedia signal comprises at least one of a composite and a digital video signal.

18. The method according to claim 17, further comprising:
  reserving a portion of an Ethernet bandwidth for channel allocation; assigning a channel allocation priority to the composite video signal; and reserving a channel path for the composite video signal.

19. The method according to claim 16, further comprising extracting a synchronization signal from the multimedia signal, wherein the performing step performs video predictive coding in synchronization with the synchronization signal.

20. The method according to claim 16, further comprising:
  extracting a synchronization signal from the uncompressed multimedia signal;
  converting the uncompressed multimedia signal from analog to digital in synchronization with the synchronization signal to create a digital multimedia signal; and
  buffering the digital multimedia signal in synchronization with the synchronization signal.

21. The method according to claim 16, wherein the performing step creates a video predictive coded multimedia signal represented by half the number of sampling bits of the uncompressed multimedia signal.

22. A method of receiving uncompressed multimedia data from a network comprising:
  using an access device to receive a video predictive coded multimedia signal from the network;
  performing video predictive decoding on the video predictive coded multimedia signal to create a multimedia signal, wherein the predictive decoding comprises:
    delaying a line of a decoded video signal, and
    subtracting a line of the video predictive coded multimedia signal from the line of the decoded video signal to create the video predictive decoded video signal; and
  outputting the multimedia signal substantially concurrently with the performing step.

23. The method according to claim 22, wherein the network comprises at least one of a Fast Ethernet network and an Ethernet network faster than Fast Ethernet and the multimedia signal comprises a composite video signal.

24. The method according to claim 23, wherein the receiving step further comprises receiving the video predictive coded multimedia signal from a reserved channel path of the Ethernet network.

25. The method according to claim 22, further comprising extracting a synchronization signal from the video predictive coded multimedia signal, wherein the outputting step outputs the multimedia signal in synchronization with the synchronization signal.

26. The method according to claim 22, further comprising:
  extracting a synchronization signal while performing the video predictive decoding;
  buffering the multimedia signal in synchronization with the synchronization signal; and
  converting the multimedia signal from digital to analog in synchronization with the synchronization signal.

27. The method according to claim 22, wherein the receiving step receives a video predictive coded multimedia signal.

28. A method of transmitting and switching multimedia data over at least one of a Fast Ethernet network and an Ethernet network faster than Fast Ethernet comprising:
  allocating a portion of an Ethernet bandwidth for channel allocation;
  using an access device to receive an uncompressed multimedia signal;
  assigning a channel allocation priority to the uncompressed multimedia signal;

transmitting data-including the channel allocation priority in the allocated portion of the Ethernet bandwidth;

performing video predictive coding on the uncompressed multimedia signal to create a video predictive coded multimedia signal, wherein the predictive coding comprises:

delaying a first line of the multimedia signal, and subtracting a second line of the multimedia signal from the delayed first line of the multimedia signal to create the video predictive coded multimedia signal; and transmitting the video predictive coded multimedia signal over the network in real time.

29. The method according to claim 28, wherein the uncompressed multimedia signal comprises at least one of a composite and a digital video signal.

30. The method according to claim 28, wherein the transmitting step further comprises transmitting a data packet including a header and a payload, wherein the header includes the address of a master switch and the payload includes the channel allocation priority.

31. The method according to claim 28, further comprising:

receiving a video predictive coded multimedia signal from the network;

performing video predictive decoding on the video predictive coded multimedia signal to create a multimedia signal; and outputting the multimedia signal substantially concurrently with the performing step.

\* \* \* \* \*